(12) United States Patent
Cai et al.

(10) Patent No.: US 11,640,024 B2
(45) Date of Patent: May 2, 2023

(54) DISPLAYING MODULE AND DISLAYING DEVICE

(71) Applicants: Beijing BOE Optoelectronics Technology Co., Ltd., Beijing (CN); BOE Technology Group Co., Ltd., Beijing (CN)

(72) Inventors: Xiujun Cai, Beijing (CN); Cuie Wang, Beijing (CN); Sa Li, Beijing (CN); Wenli Lan, Beijing (CN); Yanming Wang, Beijing (CN); Runfei Du, Beijing (CN); Gaowei Chen, Beijing (CN); Dong Wang, Beijing (CN); Lidong Wang, Beijing (CN); Dawei Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/485,197

(22) Filed: Sep. 24, 2021

(65) Prior Publication Data
US 2022/0236475 A1 Jul. 28, 2022

(30) Foreign Application Priority Data
Jan. 22, 2021 (CN) .......................... 202120182784.X

(51) Int. Cl.
*F21V 8/00* (2006.01)

(52) U.S. Cl.
CPC ......... *G02B 6/0053* (2013.01); *G02B 6/0051* (2013.01); *G02B 6/0055* (2013.01)

(58) Field of Classification Search
CPC ... G02B 6/0053; G02B 6/0051; G02B 6/0055
See application file for complete search history.

(56) References Cited

U.S. PATENT DOCUMENTS 10,520,662 B1 * 12/2019 Chen ..................... G02F 1/1333
2021/0294015 A1 * 9/2021 Yin ...................... G02B 6/0051

* cited by examiner

*Primary Examiner* — Andrew J Coughlin
*Assistant Examiner* — Jessica M Apenteng
(74) *Attorney, Agent, or Firm* — IPro, PLLC

(57) ABSTRACT

A displaying module and a displaying device. The displaying module includes a backlight module and a display panel arranged at a light-emitting side of the backlight module, wherein the backlight module is provided with an ambient light hole penetrating through the backlight module along a direction perpendicular to a light-emitting surface of the backlight module; and a side, facing the backlight module, of the display panel is provided with a light equalization layer which covers the ambient light hole. By arranging the equalization layer at the side, facing the backlight module, of the display panel and at a position corresponding to the ambient light hole, when a screen of the display panel is black, the display panel is non-transparent, and the light equalization layer located at the side, facing the backlight module, of the display panel is incapable of being seen via the display panel.

20 Claims, 2 Drawing Sheets

DISPLAYING MODULE AND DISLAYING DEVICE

CROSS REFERENCE TO RELEVANT DISCLOSURES

The present application claims the priority of the Chinese patent application filed on Jan. 22, 2021 before the Chinese Patent Office with the application number of 202120182784.X and the title of " DISPLAYING MODULE AND DISLAYING DEVICE", which is incorporated herein in its entirety by reference.

TECHNICAL FIELD

The disclosure relates to the technical field of display, in particular to a displaying module and a displaying device.

BACKGROUND

A displaying module has diversified forms to achieve a narrow frame, such as a full screen, a blind hole screen and a water drop screen, among which the blind hole screen is capable of achieving an extremely narrow frame of a displaying module.

For an ambient light hole in a blind hole screen, light entering the ambient light hole from different directions may be different in intensity, which may cause influences on accurate determination of a light detection unit on an intensity of external light passing through the ambient light hole.

SUMMARY

The embodiment of the disclosure discloses a displaying module, which includes a backlight module and a display panel arranged at a light-emitting side of the backlight module, wherein the backlight module is provided with an ambient light hole penetrating through the backlight module along a direction perpendicular to a light-emitting surface of the backlight module;

a light equalization layer, is arranged at a side, facing the backlight module, of the display panel, wherein the light equalization layer covers the ambient light hole. Optionally, the displaying module further includes a cover plate arranged at a side, away from the backlight module, of the display panel;

a light shielding layer is arranged at a side, facing the display panel, of the cover plate; and an orthographic projection of the ambient light hole on the cover plate is within the orthographic projection of the light shielding layer on the cover plate.

Optionally, the light shielding layer comprises a first light shielding layer and a second light shielding layer which are arranged in layer configuration; the first light shielding layer is located between the cover plate and the second light shielding layer; the first light shielding layer and the second light shielding layer are each provided with a penetrating through hole;

the light shielding layer further comprises a semi-transparent layer covering the second light shielding layer and the cover plate, wherein, an orthographic projection of each through hole on the cover plate is overlapped with the orthographic projection of the ambient light hole on the cover plate.

Optionally, the light equalization layer is a white ink layer with a thickness of 7 μm to 10 μm.

Optionally, the light equalization layer is a diffusion film with a thickness less than or equal to 50 μm.

Optionally, each of the first light shielding layer, the second light shielding layer and the semi-transparent layer has a thickness of 7 μm to 10 μm.

Optionally, the display panel comprises an array substrate and a color film substrate which are aligned in relative position;

the color film substrate comprises a black matrix arranged around the ambient light hole; and an orthographic projection of an edge of the light equalization layer on the color film substrate is within an area where the black matrix is located.

Optionally, the display panel further comprises a first polarizer arranged at a side, away from the array substrate, of the color film substrate, as well as a second polarizer arranged at a side, away from the color film substrate, of the array substrate;

wherein, orthographic projections of the first polarizer and the second polarizer on the backlight module are not overlapped with of the ambient light hole.

Optionally, the backlight module comprises a reflecting plate, a light guide plate, a diffuser and a brightening plate which are arranged in layer configuration;

the backlight module further comprises a supporting structure which comprises a first supporting part and a second supporting part, wherein the first supporting part is arranged at a side, away from the light guide plate, of the reflecting plate; the second supporting part is perpendicular to the light-emitting surface of the backlight module and arranged around the ambient light hole;

the backlight module further comprises a first light shielding adhesive; the first light shielding adhesive covers a first surface of the second supporting part and extends to a surface of a side, facing the display panel, of the brightening film; and the first surface of the second supporting part is a surface, facing the display panel, of the second supporting part.

Optionally, a second light shielding adhesive, is arranged at the side close to the ambient light hole, of the second supporting part; and the second light shielding adhesive is bonded with the light equalization layer.

The embodiment of the disclosure further discloses a displaying device which includes the above displaying module.

BRIEF DESCRIPTION OF THE DRAWINGS

To describe the technical solutions of the embodiments of the disclosure more clearly, the accompanying drawings required to describe the embodiments of the disclosure are briefly described below. Apparently, the accompanying drawings described below merely illustrate some embodiments of the disclosure. Those of ordinary skill in the art may further obtain other accompanying drawings based on these accompanying drawings without creative efforts.

DETAILED DESCRIPTION

The technical solutions in the embodiments of the disclosure will be described below clearly and completely with reference to the accompanying drawings in the embodiments of the disclosure. Apparently, the described embodiments are merely some rather than all of the embodiments of the disclosure. All other embodiments obtained by those of ordinary skill in the art based the embodiments in the disclosure without creative efforts shall fall within the protection scope of the disclosure.

In the related art, when an ambient light hole is formed in a blind hole screen, the ambient light hole is formed in a direction perpendicular to a light-emitting surface of a backlight module, and a light detection unit is arranged at a position corresponding to the ambient light hole; the light detection unit is used for sensing an intensity of external ambient light and adjusting a brightness of a displaying module according to the sensed intensity of the external ambient light; light entering the ambient light hole from different directions may be different in intensity, which may cause influences on accurate determination of the light detection unit on the intensity of the external light. Thus, a display brightness of the displaying module will not be adjusted accurately.

Figure 1:
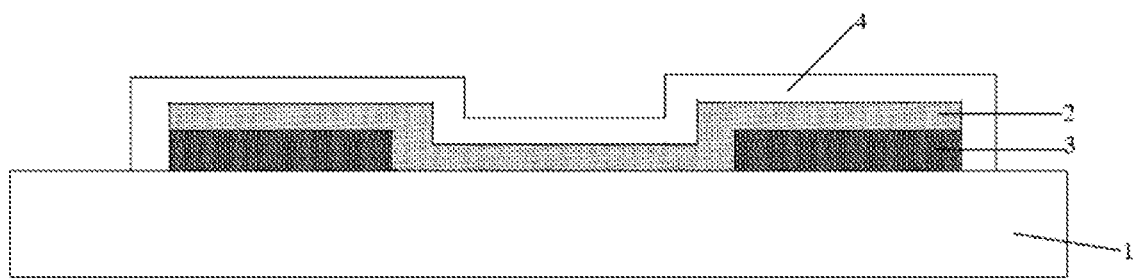
FIG. 1 illustrates a schematic sectional view of a cover plate in the prior art.

Therefore, in order to make the intensity of the light entering the ambient light hole more uniform, in the related art, as shown in FIG. 1, a light shielding layer at a side, facing a display panel, of a cover plate 1 in the displaying module and at a position corresponding to the ambient light hole may be coated with a white ink layer 4, wherein the light shielding layer includes a semi-transparent layer 2 and a non-transparent layer 3; or, a diffusing film is adhered to a side, away from the display panel, of the backlight module and to a position corresponding to the ambient light hole. The light entering the ambient light hole is diffused by the white ink layer 4 or the diffusing film, so that ambient light with a relatively uniform intensity is obtained, thus improving the accuracy of determining an intensity of the external ambient light.

Figure 2:
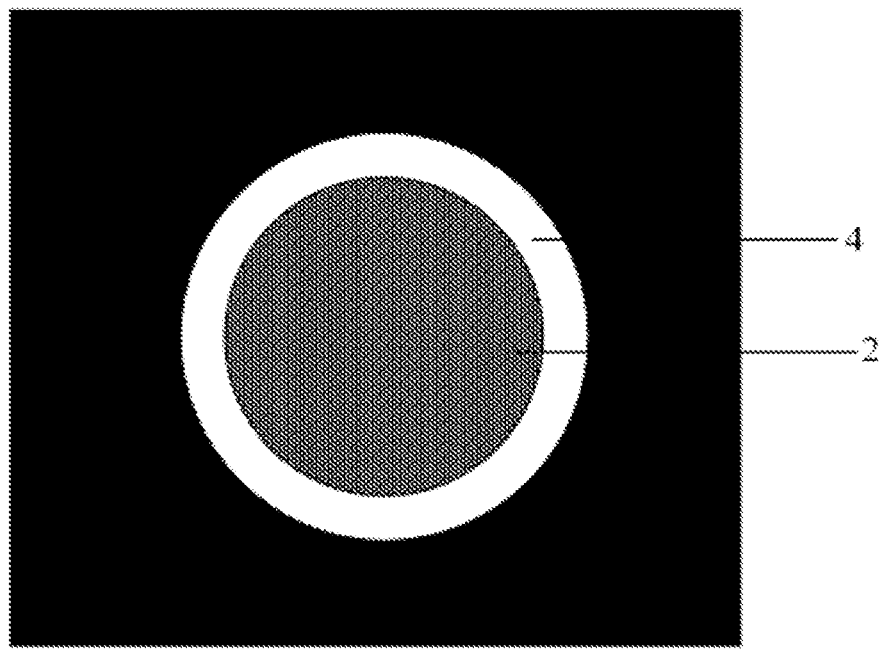
FIG. 2 illustrates a schematic plan view of a displaying module provided with a cover plate in FIG. 1.

However, when the light shielding layer 3 at a side, facing the display panel, of the cover plate 1 is coated with the white ink layer 4, a coating range of the white ink layer 4 is likely to beyond a range of the semi-transparent layer 2 and the non-transparent layer 3 due to process fluctuations in a coating process; after the range of the white ink layer 4 is beyond the range of the semi-transparent layer 2 and the non-transparent layer 3, the white ink layer 4 is capable of being observed via the cover plate when a screen of the display panel in the displaying module is black since the cover plate 1 is transparent; as shown in FIG. 2, a phenomenon of "Panda Eye" will occur at a position of the ambient light hole in the displaying module, which affects a visual effect of the displaying module; when a diffusing film is adhered to a side, away from the display panel, of the backlight module and a position corresponding to the ambient light hole, the diffusing film is likely to fall off after being externally scratched due to a thin and small size; after the diffusing film falls off, the light entering the ambient light hole will not be diffused, thus affecting the accuracy of the displaying module for determining the intensity of external ambient light.

Therefore, in this embodiment of the disclosure, a light equalization layer is arranged at a side, facing the backlight module, of the display panel and covers the ambient light hole; when the screen of the display panel is black, the display panel is non-transparent, and the light equalization layer located at a side, facing the backlight module, of the display panel is incapable of being seen via the display panel, thus the phenomenon of "Panda Eye" is avoided; and in addition, the light equalization layer is located between the display panel and the backlight module, so the light equalization layer is prevented from external scratches and is unlikely to fall off, such that the light entering the ambient light hole is effectively diffused.

Figure 3:
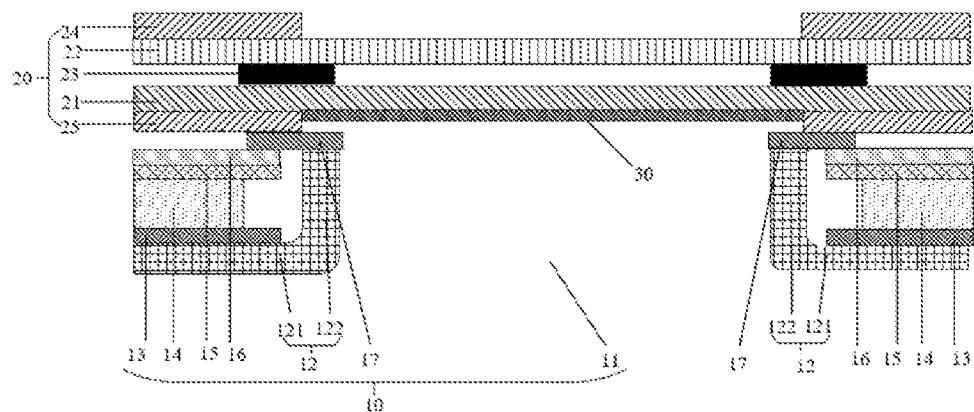
FIG. 3 illustrates a schematic sectional view of a backlight module in an embodiment of the disclosure.

FIG. 3 illustrates a schematic sectional view of a displaying module of an embodiment of the disclosure.

This embodiment of the disclosure provides a displaying module, which includes a backlight module 10 and a display panel 20 arranged at a light-emitting side of the backlight module 10, wherein the backlight module 10 is provided with an ambient light hole 11 penetrating through the backlight module 10 along a direction perpendicular to a light-emitting surface of the backlight module 10; and a side, facing the backlight module 10, of the display panel 20 is provided with a light equalization layer 30 which covers the ambient light hole 11.

In this embodiment of the disclosure, the displaying module includes a backlight module 10 which is provided with the ambient light hole 11 penetrating through the backlight module 10 along the direction perpendicular to the light-emitting surface of the backlight module 10; the displaying module further includes the display panel 20 which is an organic light-emitting diode (OLED) display panel or a thin film transistor-liquid crystal display (TFT-LCD) panel; the display panel 20 is located at one side of the light-emitting surface of the backlight module 10; and the light equalization layer 30 is arranged at the side, facing the backlight module 10, of the display panel 20; and after the backlight module 10 and the display panel 20 are assembled, the light equalization layer 30 on the display panel 20 covers the ambient light hole 11 in the backlight module 10.

When external light irradiates the display panel 20, the light passes through the display panel 20 and reaches the light equalization layer 30 at the side, facing the backlight module 10, of the display panel 20; and the light equalization layer 30 diffuses the light irradiating thereon to obtain light with a uniform intensity.

Since the external light irradiating the ambient light hole 11 may include incident light with different intensities from different directions, when no light equalization layer 30 is arranged, the light entering the ambient light hole 11 includes incident light with different intensities, which may cause inaccurate detection of a light detection unit on the external ambient light, thus affecting the accuracy of adjusting a display brightness of the displaying module.

Wherein, the light detection unit is located at a side, away the display panel 20, of the backlight module 10 and corresponds to a position of the ambient light hole 11, so as to receive the light passing through the ambient light hole 11 and determine an intensity of the received light.

When the light equalization layer 30 is arranged at the side, facing the backlight module 10, of the display panel 20, since the light entering the ambient light hole 11 will first pass through the light equalization layer 30, thus the incident light with different intensities will become incident light with a uniform intensity after passing through the light equalization layer 30. After the incident light with a uniform intensity is received by the light detection unit through the ambient light hole 11, the display brightness of the displaying module is adjusted according to the intensity of the light received by the light detection unit, so that the display brightness of the displaying module is matched with a brightness of the environment where the displaying module is located; when the current environment is relatively dark, the brightness of the displaying module is reduced; and when the current environment is relatively bright, the brightness of the displaying module is increased.

In addition, the light equalization layer 30 is arranged at the side, facing the backlight module 10, of the display panel 20; when the screen of the display panel 20 is black, the display panel 20 is non-transparent, therefore the light equalization layer 30 at the side, facing the backlight module 10, of the display panel 20 will not be observed; however, according to a traditional method of arranging the light equalization layer 30 at a side, away from the backlight module 10, of the display panel 20, since the cover plate is transparent, the light equalization layer 30 will be displayed via the cover plate when the screen of the display panel 20 is black, thus affecting a visual effect of the displaying module. In this embodiment of the disclosure, the light equalization layer 30 will not be observed via the display panel 20, so the visual effect of the displaying module is improved.

In addition, the light equalization layer 30 is arranged at the side, facing the backlight module 10, of the display panel 20; after the backlight module 10 and the display panel 20 are assembled, the light equalization layer 30 is sandwiched between the backlight module 10 and the display panel 20 and is prevented from external scratches, therefore the light equalization layer 30 is unlikely to fall off and capable of commendably diffusing the light entering the ambient light hole 11.

Figure 4:
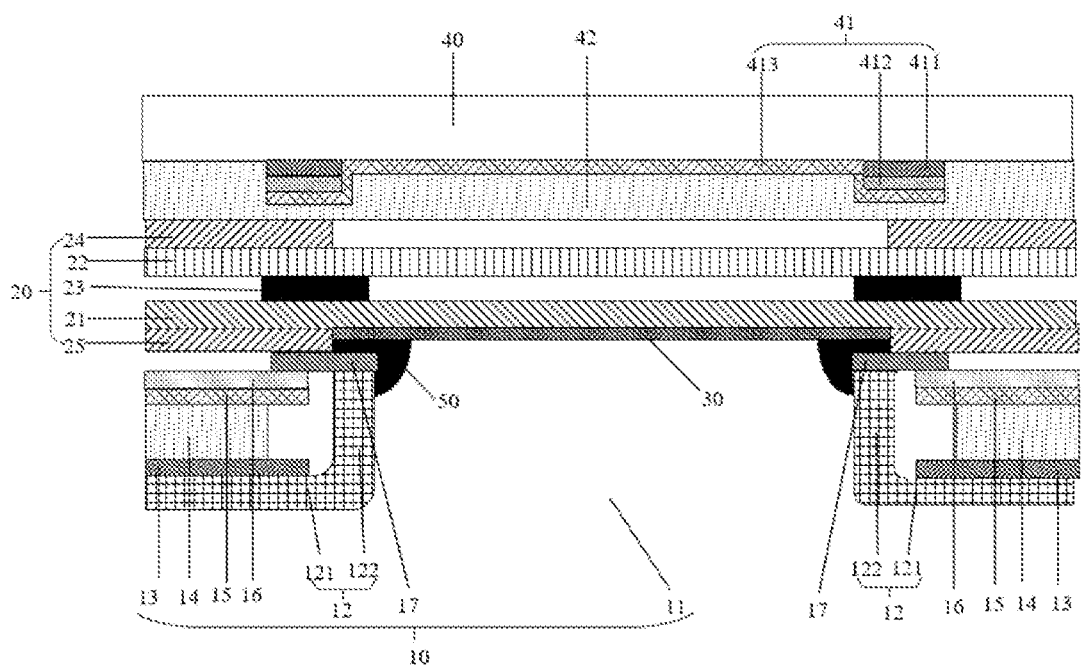
FIG. 4 is a schematic sectional view of another backlight module in an embodiment of the disclosure.

Further, as shown in FIG. 4, the displaying module further includes a cover plate 40 arranged at a side, away from the backlight module 10, of the display panel 20; a side, facing the display panel 20, of the cover plate 40 is provided with a light shielding layer 41; and an orthographic projection of the ambient light hole 11 on the cover plate 40 is within that of the light shielding layer 41 on the cover plate 40.

In this embodiment of the disclosure, a cover plate 40 is further arranged at the side, away from the backlight module 10, of the display panel 20; a light shielding layer 41 is arranged at the side, facing the display panel 20, of the cover plate 40; an orthographic projection of the ambient light hole 11 on the cover plate 40 is within that of the light shielding layer 41 on the cover plate 40; and by arranging the light shielding layer 41, light leakage at an edge of the ambient light hole 11 may be prevented, and the display effect of the display panel 20 is improved.

Wherein, a transparent adhesive 42 is further arranged at the side, facing the display panel 20, of the cover plate 40; the transparent adhesive 42 makes contact with the cover plate 40 and the light shielding layer 41; and the cover plate 40 and the display panel 20 are bonded together by the transparent adhesive 42.

In this embodiment of the disclosure, the light shielding layer 41 includes a first light shielding layer 411 and a second light shielding layer 412 which are arranged in layer configuration, wherein the first light shielding layer 411 is located between the cover plate 40 and the second light shielding layer 412; the first light shielding layer 411 and the second light shielding layer 412 are each provided with a penetrating through hole; and the light shielding layer 41 further includes a semi-transparent layer 413 covering the second light shielding layer 412 and the cover plate 40, wherein an orthographic projection of each through hole on the cover plate 40 is overlapped with that of the ambient light hole 11 on the cover plate 40.

In this embodiment of the disclosure, the light shielding layer 41 includes a first light shielding layer 411 and a second light shielding layer 412; the first light shielding layer 411 is arranged on a surface of a side, facing the display panel 20, of the cover plate 40; the second light shielding layer 412 is arranged at a side, away from the cover plate 40, of the first light shielding layer 411; in other words, the first light shielding layer 411 is located between the cover plate 40 and the second light shielding layer 412; in addition, the first light shielding layer 411 and the second light shielding layer 412 are each provided with a penetrating through hole; the through holes partially expose the cover plate 40; an orthographic projection of the first light shielding layer 411 on the cover plate 40 is overlapped with that of the second light shielding layer 412 on the cover plate 40 to a certain extent; specifically, the orthographic projection of the first light shielding layer 411 on the cover plate 40 and that of the second light shielding layer 412 on the cover plate 40 may be partially overlapped or completely overlapped, preferably completely overlapped.

The light shielding layer 40 further includes a semi-transparent layer 413; a part of the semi-transparent layer 413 is located on the surface of a side, away from the first light shielding layer 411, of the second light shielding layer 412; and the other part of the semi-transparent layer 413 covers the cover plate 40 exposed by the through holes in the first light shielding layer 411 and the second light shielding layer 412, and penetrates through side walls of the through holes of the first light shielding layer 411 and the second light shielding layer 412.

The semi-transparent layer 413 has a transmittance less than 100%, and a specific transmittance of the semi-transparent layer 413 may be set according to an actual situation, which is not limited by the embodiment of the disclosure. The semi-transparent layer 413 has a certain light transmission capability; external light may enter the ambient light hole 11 through the semi-transparent layer 413; the semi-transparent layer 413 also has a certain light shielding capability; and when the screen of the display panel 20 is black, the semi-transparent layer 413 can hide the ambient light hole 11 due to the certain light shielding capability, so that the displaying module achieves a better visual effect.

Wherein, an orthographic projection of the through hole penetrating through the first and second light shielding layers 411 and 412 on the cover plate 40 are overlapped with that of the ambient light hole 11 on the cover plate 40 to a certain extent. Specifically, the orthographic projection of the through hole penetrating through the first and second light shielding layers 411 and 412 on the cover plate 40 and that of the ambient light hole 11 on the cover plate 40 may be partially overlapped or completely overlapped, preferably completely overlapped, so that the external light may enter the ambient light hole 11 as much as possible to improve the accuracy of determining the external ambient light subsequently.

In this embodiment of the disclosure, the first light shielding layer 411 and the second light shielding layer 412 are each a non-transparent black ink layer, and the semi-transparent layer 413 is semi-transparent black ink layer. The first light shielding layer 411, the second light shielding layer 412 and the semi-transparent layer 413 are all formed by screen printing, or by exposure and development, or by transfer printing. Specific forming ways of the first light shielding layer 411, the second light shielding layer 412 and the semi-transparent layer 413 are not limited in this embodiment of the disclosure.

In this embodiment of the disclosure, the light equalization layer 30 is a white ink layer with a thickness of 7 μm to 10 μm.

In this embodiment of the disclosure, the light equalization layer 30 is a white ink layer, which is printed at the side, facing the backlight module 10, of the display panel 20 by screen printing and arranged corresponding to the ambient light hole 11. Certainly, the white ink layer may be formed by exposure and development, or by transfer printing; and a specific forming way of the white ink layer is not limited in this embodiment of the disclosure.

The white ink layer covers the ambient light hole 11, so that the light entering the ambient light hole 11 first irradiates the white ink layer, and then enters the ambient light hole 11 after being diffused by the white ink layer, and in this way the intensity of the light entering the ambient light hole 11 is relatively uniform.

The white ink layer has a thickness of 7 μm to 10 μm; if the white ink layer is too thin, the white ink layer may not have a desired diffusion effect on external light; and if too thick, the white ink layer may waste materials and affect an adhesion degree between the display panel 20 and the backlight module 10. Therefore, by reasonably setting the thickness of the white ink layer, the white ink layer not only has an excellent diffusion effect on the external light, but also will not affect the adhesion degree between the display panel 20 and the backlight module 10, and materials are saved as well.

In this embodiment of the disclosure, the light equalization layer 30 is a diffusing film with a thickness less than or equal to 50 μm.

Optionally, the light equalization layer 30 may be a diffusing film which is arranged at the side, facing the backlight module 10, of the display panel 20 and covers the ambient light hole 11 in the backlight module 10; and external light may first irradiate the diffusing film when entering the ambient light hole 11 and then enters the ambient light hole 10 after diffused by the diffusing film, so that the light entering the ambient light hole 11 may have a relatively uniform intensity.

The thickness of the diffusing film is less than or equal to 50 μm; if the diffusing film is too thick, the adhesion degree between the backlight module 10 and the display panel 20 may be affected; therefore, by reasonably setting the thickness of the diffusing film, the backlight module 10 and the display panel 20 can be bonded more closely.

In this embodiment of the disclosure, each of the first light shielding layer 411, the second light shielding layer 412 and the semi-transparent layer 413 has a thickness of 7 μm to 10 μm.

In this embodiment of the disclosure, the first light shielding layer 411 and the second light shielding layer 412 each have a thicknesses of 7 μm to 10 μm; if the first light shielding layer 411 and the second light shielding layer 412 are too thin, the light shielding capability is not high enough, which may affect a light shielding effect on an edge of the ambient light hole 11; when the first light shielding layer 411 and the second light shielding layer 412 are too thick, materials are wasted, and the adhesion degree between the cover plate 40 and the display panel 20 may be affected. Therefore, by reasonably setting the thickness of the first light shielding layer 411 and the second light shielding layer 412, the first light shielding layer 411 and the second light shielding layer 412 may achieve a good light shielding effect without affecting the adhesion degree between the cover plate 40 and the display panel 20, and also saves materials.

The semi-transparent layer 413 has a thickness of 7 μm to 10 μm; the semi-transparent layer 413 should play a role in hiding the ambient light hole 11 and should also enable light to enter the ambient light hole 11 through the semi-transparent layer 413; therefore, if the semi-transparent layer 413 is too thick, it is not conductive for light to enter the ambient light hole 11; and if the semi-transparent layer 413 is too thin, the ambient light hole 11 may not be hidden. Therefore, by reasonably setting the thickness of the semi-transparent layer 413, the semi-transparent layer 413 not only transmits light, but also hides the ambient light hole 11.

In this embodiment of the disclosure, the display panel 20 includes an array substrate 21 and a color film substrate 22 which are aligned in a box; the color film substrate 22 includes a black matrix 23 arranged around the ambient light hole 11; and an orthographic projection of an edge of the liquid equalization layer 30 on the color film substrate 22 is within an area where the black matrix 23 is located.

In this embodiment of the disclosure, the display panel 20 includes an array substrate 21 and a color film substrate 22 which are aligned in relative position; the color film substrate 22 is provided with a black matrix 23 arranged around the ambient light hole 11; and in addition, an orthographic projection of an edge of the liquid equalization layer 30 on the color film substrate 22 is within an area where the black matrix 23 is located.

Specifically, the black matrix 23 includes a first side surface close to the ambient light hole 11 and a second side surface away from the ambient light hole 11; an orthographic projection of the light equalization layer 30 on the array substrate 21 is located between a closed image formed by an orthographic projection of the first side surface on the array substrate 21 and a closed image formed by an orthographic projection of the second side surface on the array substrate 21.

For example, when the ambient light hole 11 is cylindrical, the orthographic projection of the ambient light hole 11 on the array substrate 21 is circular, the orthographic projection of the first side surface of the black matrix 23 on the array substrate 21 is also circular, and the orthographic projection of the second side surface of the black matrix 23 on the array substrate 21 may be circular or other shapes. At the moment, the orthographic projection of the light equalization layer 30 on the array substrate 21 is located between a circular shape formed by the orthographic projection of the first side surface on the array substrate 21 and a circular shape formed by the orthographic projection of the second side surface on the array substrate 21. Therefore, the edge of the light equalization layer 30 may be shielded by the black matrix 23, thus the light equalization layer 30 is prevented from extending to a normal display area, such that the display effect of the display area is not affected.

In this embodiment of the disclosure, the display panel 20 further includes a first polarizer 24 and a second polarizer 25, wherein the first polarizer 24 is arranged at a side, away from the array substrate 21, of the color film substrate 22; the second polarizer 25 is arranged at a side, away from the color film substrate 22, of the array substrate 21, wherein orthographic projections of the first polarizer 24 and the second polarizer 25 on the backlight module 10 are not overlapped with the ambient light hole 11.

Specifically, before the first polarizer 24 is adhered to the side, away from the array substrate 21, of the color film substrate 22, a structure, at a position corresponding to the ambient light hole 11 in the backlight module 10, in the first polarizer 24 is removed; before the second polarizer 25 is adhered to the side, away from the color film substrate 22, of the array substrate 21, a structure, at a position corresponding to the ambient light hole 11 in the backlight module 10, in the second polarizer 25 is removed as well, such that the orthographic projections of the first polarizer 24 and the second polarizer 25 on the backlight module 10 are not overlapped with the ambient light hole 11, and therefore the external light is capable of entering the ambient light hole 11 as much as possible through the display panel 20.

In this embodiment of the disclosure, the backlight module 10 includes a reflecting plate 13, a light guide plate 14, a diffusion plate 15 and a brightening film 16 which are arranged in layer configuration; the backlight module 10 further includes a supporting structure 12 which includes a first supporting part 121 and a second supporting part 122, wherein the first supporting part 121 is arranged at a side, away from the light guide plate 14, of the reflecting plate 13; the second supporting part 122 is perpendicular to the light-emitting surface of the backlight module 10 and arranged around the ambient light hole 11; the backlight module 10 further includes a first light shielding adhesive 17; the first light shielding adhesive 17 covers a first surface of the second supporting part 122 and extends to a surface of a side, facing the display panel 20, of the brightening film 16; and the first surface of the second supporting part 122 is a surface, facing the display panel 20, of the second supporting part 122.

In this embodiment of the disclosure, the backlight module 10 includes a first supporting part 121 and a second supporting part 122 which are vertically connected with each other; the first supporting part 121 is arranged in a direction parallel to the light-emitting surface of the backlight module 10; the second supporting part 122 is arranged in a direction perpendicular to the light-emitting surface of the backlight module 10; and the second supporting part 122 is arranged around the ambient light hole 11.

The backlight module 10 further includes a reflecting plate 13, a light guide plate 14, a diffusion plate 15 and a brightening film 16 which are arranged in layer configuration. Specifically, the reflecting plate 13 is arranged at a side, facing the display panel 20, of the first support part 121; the light guide plate 14 is arranged at a side, away from the first supporting part 121, of the reflecting plate 13; the diffusion plate 15 is arranged at a side, away from the reflecting plate 13, of the diffusion plate 15; and the brightening film 16 is arranged at a side, away from the light guide plate 14, of the diffusion plate 15. The first supporting part 121 is configured to support the reflecting plate 13, the light guide plate 14, the diffusion plate 15 and the brightening film 16 which are located on the first supporting part 121.

The backlight module 10 further includes a first light shielding adhesive 17; the first light shielding adhesive 17 covers a surface, facing the display panel 20, of the second supporting part 122, and extends to a surface, facing the display panel 20, of the brightening film 16; and the second supporting part 122 may be fixedly connected with the brightening film 16 by the first light shielding adhesive 17.

In addition, the first light shielding adhesive 17 is a double-sided adhesive; a side, away from the brightening film 16, of the first light shielding adhesive 17 makes contact with the second polarizer 25 in the display panel 20, such that the display panel 20 may be fixedly connected with the backlight module 10 by the first light shielding adhesive 17.

It should be noted that the ambient light hole 11 in the backlight module 10 is formed as follows: firstly, a supporting structure 12 is punched to form the first supporting part 121, the second supporting part 122 and a first opening which penetrates through the supporting structure 12; subsequently, the reflecting plate 13, the light guide plate 14, the diffusion plate 15 and the brightening film 16 which are each provided with a second opening are sequentially arranged in a direction perpendicular to and away from the first supporting part 121; the positions of the second openings formed in the reflecting plate 13, the light guide plate 14, the diffusion plate 15 and the brightening film 16 all correspond to the position of the first opening formed in the supporting structure 12; and the first opening and the second openings form the ambient light hole 11.

When the light equalization layer 30 is a diffusing film, the diffusing film and the first light shielding adhesive 17 are bonded first and then cut, and then the cut diffusing film and first light shielding adhesive 17 are bonded with a surface, facing the display panel 20, of the second supporting part 122, and extend to a surface of a side, facing the display panel 20, of the brightening film 16; and finally, the backlight module 10 bonded with the diffusing film and the first light shielding adhesive 17 is assembled with the display panel 20, wherein an orthographic projection of the diffusing film on the display panel 20 is not overlapped with the second polarizer 25, such that the display panel 20 and the backlight module 10 are bonded more closely when assembled.

When the light equalization layer 30 is a white ink layer, firstly the white ink layer is silk-printed on a surface, facing the backlight module 10, of the display panel 20, and the white ink layer is not overlapped with the second polarizer 25 in the display panel 20; the first light shielding adhesive 17 is adhered to a surface of a side, facing the display panel 20, of the second supporting part 122, and extends to a surface of a side, facing the display panel 20, of the brightening film 16; and finally the backlight module 10 bonded with the first light shielding adhesive 17 is assembled with the display panel 20 on which the white ink layer is silk-printed, such that the white ink layer corresponds to the ambient light hole in the backlight module 10.

In this embodiment of the disclosure, a side, close to the ambient light hole 11, of the second supporting part 122 is provided with a second light shielding adhesive 50; and the second light shielding adhesive 50 is bonded with the light equalization layer 30.

In this embodiment of the disclosure, the second light shielding adhesive 50 is arranged in the ambient light hole 11 and located at a side, close to the ambient light hole 11, of the second supporting part 122; in addition, the second light shielding adhesive 50 is further bonded with the light equalization layer 30, such that the light equalization layer 30 may be fixed to a light inlet of the ambient light hole 11 to ensure that the light enters the ambient light hole 11 after passing through the light equalization layer 30.

In addition, the second light shielding adhesive 50 is further bonded with the first light shielding adhesive 17 to together realize fixed connection between the backlight module 10 and the display panel 20.

When the light equalizing layer 30 is a white ink layer, the light equalization layer 30 has a smaller thickness than the second polarizer 25; and therefore, the second light shielding 50 is further bonded with a surface of a side, facing the ambient light hole 11, of the second polarizer 25, so as to prevent light leakage at the side, facing the ambient light hole 11, of the second polarizer 25.

When the light equalization layer 30 is a diffusing film which is thick, the diffusing film has the same thickness as the second polarizer 25, and at the moment, the second light shielding adhesive 50 does not make contact with the second polarizer 25.

It should be noted that in this embodiment of the disclosure, when the white ink layer is silk-printed at the side, facing the backlight module 11, of the display panel 20, the white ink layer is silk-printed on all the display panels on a motherboard before the display panels 20 are cut off from the motherboard; and at the moment, the white ink layer may be silk-printed on a plurality of display panels 20 at one time, which improves the production efficiency.

In this embodiment of the disclosure, by arranging the equalization layer at the side, facing the backlight module, of the display panel and at a position corresponding to the ambient light hole, when the screen of the display panel is black, the display panel is non-transparent, and the light equalization layer located at the side, facing the backlight module, of the display panel is incapable of being seen via the display panel. In this way, a phenomenon of 'Panda Eye' is avoided. In addition, the light equalization layer is located between the display panel and the backlight module, so the light equalization layer is prevented from external scratches and is unlikely to fall off. Thus, light entering the ambient light hole is effectively diffused.

An embodiment of the disclosure further provides a displaying device including the above displaying module.

The displaying device further includes a light detection unit located at a side, away from the display panel 20, of the backlight module 10; the light detection unit is used for detecting a brightness of external ambient light; and the displaying device further includes elements such as a drive chip, a timer control register (TCON), etc.

In practical disclosure, the displaying device may be any product or component with a display function, such as a mobile phone, a tablet personal computer, a television, a displayer, a notebook computer and a navigator.

In this embodiment of the disclosure, by arranging the equalization layer at the side, facing the backlight module, of the display panel and at a position corresponding to the ambient light hole, when the screen of the display panel is black, the display panel is non-transparent, and the light equalization layer located at the side, facing the backlight module, of the display panel is incapable of being seen via the display panel. In this way, a phenomenon of 'Panda Eye' is avoided. In addition, the light equalization layer is located between the display panel and the backlight module, so the light equalization layer is prevented from external scratching and is unlikely to fall off. Thus, light entering the ambient light hole is effectively diffused.

Although preferred embodiments of the embodiments of the disclosure have been described, those skilled in the art can make other alterations or modifications to these embodiments after knowing the basic creative concepts. Therefore, the appended claims are intended to be interpreted as including the preferred embodiments and all alterations and modifications falling within the scope of the disclosure.

Lastly, it should be noted that the terms 'comprise' and 'include' herein or any other variants thereof are intended to cover nonexclusive inclusion, such that a process, method, object or terminal device including a series of elements does not merely include those elements listed, but also includes other elements which are not listed clearly, or further includes inherent elements of this process, method, object or terminal device. Without more limitations, an element defined by a sentence 'include one' means that a process, method, object or terminal device including the element can still include another same element.

The above description is merely specific implementations of the disclosure, and is not intended to limit the protection scope of the disclosure. Alterations or substitutions easily considered by any technical personnel familiar with the technical field in the technical scope disclosed by the disclosure shall fall within the protection scope of the disclosure. Therefore, the protection scope of the disclosure should be subject to the protection scope defined by the claims.

The invention claimed is:

1. A displaying module, comprising a backlight module and a display panel arranged at a light-emitting side of the backlight module, wherein the backlight module is provided with an ambient light hole penetrating through the backlight module along a direction perpendicular to a light-emitting surface of the backlight module;
   a light equalization layer, is arranged at a side, facing the backlight module, of the display panel, wherein the light equalization layer covers the ambient light hole;
   the light equalization layer is located between the display panel and the backlight module;
   when external light irradiates the display panel, the light passes through the display panel and reaches the light equalization layer at the side, facing the backlight module of the display panel; and
   a light detection circuit is located at a side, away the display panel, of the backlight module and corresponds to a position of the ambient light hole, so as to receive the light passing through the ambient light hole and determine an intensity of the light.

2. The displaying module according to claim 1, further comprising a cover plate arranged at a side, away from the backlight module, of the display panel, wherein
   a light shielding layer is arranged at a side, facing the display panel, of the cover plate; and an orthographic projection of the ambient light hole on the cover plate is within the orthographic projection of the light shielding layer on the cover plate.

3. The displaying module according to claim 2, wherein the light shielding layer comprises a first light shielding layer and a second light shielding layer which are arranged in layer configuration; the first light shielding layer is located between the cover plate and the second light shielding layer; the first light shielding layer and the second light shielding layer are each provided with a penetrating through hole;
   the light shielding layer further comprises a semi-transparent layer covering the second light shielding layer and the cover plate,
   wherein, an orthographic projection of each through hole on the cover plate is overlapped with the orthographic projection of the ambient light hole on the cover plate.

4. The displaying module according to claim 1, wherein the light equalization layer is a white ink layer with a thickness of 7 μm to 10 μm.

5. The displaying module according to claim 1, wherein the light equalization layer is a diffusion film with a thickness less than or equal to 50 μm.

6. The displaying module according to claim 3, wherein each of the first light shielding layer, the second light shielding layer and the semi-transparent layer has a thickness of 7 μm to 10 μm.

7. The displaying module according to claim 1, wherein the display panel comprises an array substrate and a color film substrate which are aligned in relative position;
   the color film substrate comprises a black matrix arranged around the ambient light hole; and an orthographic projection of an edge of the light equalization layer on the color film substrate is within an area where the black matrix is located.

8. The displaying module according to claim 7, wherein the display panel further comprises a first polarizer arranged at a side, away from the array substrate, of the color film substrate, as well as a second polarizer arranged at a side, away from the color film substrate, of the array substrate;

wherein, orthographic projections of the first polarizer and the second polarizer on the backlight module are not overlapped with of the ambient light hole.

9. The displaying module according to claim 1, wherein the backlight module comprises a reflecting plate, a light guide plate, a diffusing plate and a brightening plate which are arranged in layer configuration;

the backlight module further comprises a supporting structure which comprises a first supporting part and a second supporting part, wherein the first supporting part is arranged at a side, away from the light guide plate, of the reflecting plate; the second supporting part is perpendicular to the light-emitting surface of the backlight module and arranged around the ambient light hole;

the backlight module further comprises a first light shielding adhesive; the first light shielding adhesive covers a first surface of the second supporting part and extends to a surface of a side, facing the display panel, of the brightening film; and the first surface of the second supporting part is a surface, facing the display panel, of the second supporting part.

10. The displaying module according to claim 9, wherein a second light shielding adhesive, is arranged at the side close to the ambient light hole, of the second supporting part; and the second light shielding adhesive is bonded with the light equalization layer.

11. A displaying device, comprising the displaying module according to claim 1.

12. The displaying device according to claim 11, further comprising a cover plate arranged at a side, away from the backlight module, of the display panel, wherein a light shielding layer is arranged at a side, facing the display panel, of the cover plate; and an orthographic projection of the ambient light hole on the cover plate is within the orthographic projection of the light shielding layer on the cover plate.

13. The displaying device according to claim 12, wherein the light shielding layer comprises a first light shielding layer and a second light shielding layer which are arranged in layer configuration; the first light shielding layer is located between the cover plate and the second light shielding layer; the first light shielding layer and the second light shielding layer are each provided with a penetrating through hole;

the light shielding layer further comprises a semi-transparent layer covering the second light shielding layer and the cover plate, wherein, an orthographic projection of each through hole on the cover plate is overlapped with the orthographic projection of the ambient light hole on the cover plate.

14. The displaying device according to claim 11, wherein the light equalization layer is a white ink layer with a thickness of 7 μm to 10 μm.

15. The displaying device according to claim 11, wherein the light equalization layer is a diffusing film with a thickness less than or equal to 50 μm.

16. The displaying device according to claim 13, wherein each of the first light shielding layer, the second light shielding layer and the semi-transparent layer has a thickness of 7 μm to 10 μm.

17. The displaying device according to claim 11, wherein the display panel comprises an array substrate and a color film substrate which are aligned in relative position;

the color film substrate comprises a black matrix arranged around the ambient light hole; and an orthographic projection of an edge of the light equalization layer on the color film substrate is within an area where the black matrix is located.

18. The displaying device according to claim 17, wherein the display panel further comprises a first polarizer arranged at a side, away from the array substrate, of the color film substrate, as well as a second polarizer arranged at a side, away from the color film substrate, of the array substrate;

wherein, orthographic projections of the first polarizer and the second polarizer on the backlight module are not overlapped with of the ambient light hole.

19. The displaying device according to claim 11, wherein the backlight module comprises a reflecting plate, a light guide plate, a diffusing plate and a brightening plate which are arranged in layer configuration;

the backlight module further comprises a supporting structure which comprises a first supporting part and a second supporting part, wherein the first supporting part is arranged at a side, away from the light guide plate, of the reflecting plate; the second supporting part is perpendicular to the light-emitting surface of the backlight module and arranged around the ambient light hole;

the backlight module further comprises a first light shielding adhesive; the first light shielding adhesive covers a first surface of the second supporting part and extends to a surface of a side, facing the display panel, of the brightening film; and the first surface of the second supporting part is a surface, facing the display panel, of the second supporting part.

20. The displaying device according to claim 19, a second light shielding adhesive, is arranged at the side close to the ambient light hole, of the second supporting part; and the second light shielding adhesive is bonded with the light equalization layer.

* * * * *